US 7,154,277 B2

(12) United States Patent
Vallinmaki et al.

(10) Patent No.: US 7,154,277 B2
(45) Date of Patent: Dec. 26, 2006

(54) METHOD AND APPARATUS FOR DETECTING FAULTS IN AC TO AC, OR DC TO AC POWER CONVERSION EQUIPMENTS WHEN THE EQUIPMENT IS IN A HIGH IMPEDANCE MODE

(75) Inventors: Alpo K. Vallinmaki, Mukwonago, WI (US); Douglas Karraker, Muskego, WI (US); Dennis Tyczkowski, Franklin, WI (US)

(73) Assignee: ABB Inc., Norwalk, CT (US)

( * ) Notice: Subject to any disclaimer, the term of this patent is extended or adjusted under 35 U.S.C. 154(b) by 0 days.

(21) Appl. No.: 10/923,365

(22) Filed: Aug. 20, 2004

(65) Prior Publication Data

US 2005/0047035 A1   Mar. 3, 2005

Related U.S. Application Data

(60) Provisional application No. 60/498,920, filed on Aug. 29, 2003.

(51) Int. Cl.
*G01R 31/02* (2006.01)
*H02M 3/24* (2006.01)

(52) U.S. Cl. .................. 324/509; 324/510; 363/95

(58) Field of Classification Search ............. 324/537, 324/509, 771, 510; 363/55, 95; 361/42
See application file for complete search history.

(56) References Cited

U.S. PATENT DOCUMENTS

| 3,761,809 | A | * | 9/1973 | Lockitt et al. ............ 324/76.29 |
| 3,808,529 | A | * | 4/1974 | Rowlands ................. 324/76.12 |
| 4,475,150 | A | * | 10/1984 | D'Atre et al. ................. 363/51 |
| 5,214,575 | A | * | 5/1993 | Sugishima et al. ............ 363/37 |
| 5,483,167 | A | * | 1/1996 | Mikami ........................ 324/510 |
| 6,330,140 | B1 | * | 12/2001 | Wilson-Jones et al. ........ 361/87 |
| 6,381,110 | B1 | * | 4/2002 | Nagashima et al. ........... 361/23 |
| 2003/0067303 | A1 | * | 4/2003 | Huber et al. ................. 324/509 |

* cited by examiner

*Primary Examiner*—Anjan Deb
(74) *Attorney, Agent, or Firm*—Michael M. Rickin; Paul R. Katterle (57) ABSTRACT

A system for use in ac to ac or dc to ac power conversion equipment to detect faults in an inverter when the inverter is in a high impedance mode. The system detects ground faults or cross wiring conditions by converting the inverter outputs to digital signals and evaluating the frequencies of the resulting signals. The system keeps the inverter in the high impedance mode until after it has been determined that neither of the described abnormal statuses exist. The system tests for both of the abnormal statuses on power up and thereafter tests only for a ground fault whenever the inverter switches are disabled.

8 Claims, 6 Drawing Sheets

METHOD AND APPARATUS FOR DETECTING FAULTS IN AC TO AC, OR DC TO AC POWER CONVERSION EQUIPMENTS WHEN THE EQUIPMENT IS IN A HIGH IMPEDANCE MODE

CROSS REFERENCE TO RELATED APPLICATION

This application claims the priority of U.S. provisional patent application Ser. No. 60/498,920 filed on Aug. 29, 2003, entitled "Method and Apparatus For Detecting High Impedance Mode Faults In AC to AC, or DC to AC Power Conversion Equipments" the contents of which are relied upon and incorporated herein by reference in their entirety, and the benefit of priority under 35 U.S.C. 119(e) is hereby claimed.

FIELD OF THE INVENTION

The present invention relates to power conversion equipment and more and particularly, to detection of faults in such equipment when the equipment is in a high impedance mode.

DESCRIPTION OF THE PRIOR ART

As is well know to those skilled in the art, the three main subsystems that can be considered as functional blocks of a modern ac drive system are the input side rectifier system, intermediate link (dc bus) with pre-charging system and output inverter system. These same subsystems are also used in, but not limited to, equipment such as electroplating, alternative power generation and uninterruptible power supplies.

The purpose of the rectifier is to convert input ac voltage, from the utility, into an intermediate dc voltage, that is, the rectifier functions as a ac to dc converter. The input rectifier system consists of a three-phase diode bridge, either ac or dc side inductor(s) and dc bus capacitors with a pre-charging system. The three-phase diode bridge converts the input ac voltage into a dc voltage. The inductor and capacitor serve as a smoothing filter for the intermediate dc voltage.

The intermediate link is a dc energy storage configured in most cases with electrolytic capacitors. In normal operation, the dc bus capacitor bank is charged close to the nominal dc bus voltage via pre-charging resistors, before a stiff connection is established from the converter output to the capacitor bank. The purpose of the pre-charging resistor is to charge the dc bus capacitors slowly by means of limiting surge current at the moment of connection to the source.

The purpose of the inverter is to convert the intermediate dc voltage into a variable frequency and a variable magnitude ac (RMS) output voltage. Thus, the inverter system functions as a dc to ac inverter. The dc voltage in the intermediate circuit is fed to the inverter bridge, which under a given control sequence inverts the dc energy to a variable frequency ac energy.

Failure modes, such as a grounded output of the inverter, or miswired output/input terminals, are a high risk for catastrophic failure. Activating the inverter into such failures would cause losses in the form of damaged electrical equipments, cleared fuses and disturbed processes.

A desirable characteristic of an inverter control system is the ability to detect the above described abnormal conditions (failure modes) without activating the inverter switches. The inverter switches are in the high impedance mode when they are not activated and go into the low impedance mode when activated. This detecting of the failure modes without activating the inverter switches avoids the severe high currents that would flow in the inverter bridge switches if those switches are activated and thus placed in the low impedance mode with a failure mode present.

Methods presently used for detecting ground faults in a three-phase inverter system are:

1) Detection of all of the three phase currents and summing the results. When the sum of all of the three current feedback values exceeds a predefined threshold, a ground fault is declared.
2) Passing all three inverter output leads through a current sensor. This method is essentially the same as the method described directly above except the summing is performed by combining the flux from all the motor leads instead of the current feedback values.
3) Placing chokes in the + and − legs of the intermediate link and then comparing the voltage drop across each choke caused by the DC link current. An imbalance in voltage indicates a ground fault.

All of the methods described above require that the transistors of the inverter be turned on so that substantial ground currents flow.

A method presently used for detecting cross wiring conditions (mains input connected to the output of the inverter) in a three phase inverter system is:

Pulsing on single transistors of the inverter for a very short duration and monitoring the current in that transistor.

This method requires very large currents to flow in the transistors and may fail if the source impedance of the mains input is too low.

The present invention overcomes the drawbacks described above of the methods presently used for detecting ground faults or cross wiring conditions in a three phase inverter system. The present invention eliminates the chance of failure of the main circuit due to a mis-wired output or an output ground fault before the power circuit is enabled. The main advantage of the present invention is to keep the power circuit in a high impedance mode until after the described failure modes (abnormal conditions) have been confirmed not to exist.

SUMMARY OF THE INVENTION

In an inverter having one or more controlled switches and an output a method that:

analyzes other than only signal level in a signal at the inverter output with the inverter operating in a mode with all of the one or more controlled switches in the inverter not energized to determine the occurrence of one or more of a predetermined number of conditions associated with the inverter output; and determines the occurrence of a fault in the inverter operating in the mode wherein all of the one or more controlled switches in the inverter are not energized when the analysis determines that one of the predetermined number of conditions associated with the inverter output exceeds an associated predetermined criteria.

A combination that has an inverter having one or more controlled switches and an output for connection to a load; and means connected to the inverter output for analyzing other than only signal level in a signal at the inverter output with the inverter operating in a mode with all of the one or more controlled switches in the inverter not energized and detecting a fault in the inverter operating in the mode wherein all of the one or more controlled switches in the inverter are not energized when the analysis of the inverter output exceeds a predetermined criteria.

A circuit for detecting the occurrence of a fault in an inverter having an output. The circuit has:

means connected to the inverter output for analyzing other than only signal level at the inverter output with the inverter operating in a ode with all of the one or more controlled switches in the inverter not energized to determine the occurrence of one or more of a predetermined number of conditions associated with the inverter output, and detecting a fault in the inverter operating in the mode wherein all of the one or more controlled switches in the inverter are not energized when the analysis of the inverter output determines that one of the predetermined number of conditions exceeds an associated predetermined criteria.

DESCRIPTION OF THE PREFERRED EMBODIMENT(S)

The present invention which uses high impedance mode fault detection (HIMFD) as described below protects power conversion equipments, by monitoring a status of the output of the inverter bridge and generates an indication (feedback) to higher level control circuits (output stage control, inverter control, output switch control) in order to disable the control command for the inverter bridge if an abnormal status exists. This prevents the inverter bridge from entering the low impedance mode in the presence of a failure mode such as a ground fault or a cross wiring condition.

The HIMFD system of the present invention makes it possible to detect an abnormal status of the inverter output in a high impedance mode, which minimizes stress for the power switches in the inverter when protecting against failed insulation and mistakes in wiring. The HIMFD system of the present invention individually detects and indicates each of the above mentioned failure cases by converting the inverter outputs to digital signals and evaluating the frequencies of the resulting signals. As is described below that signal which is generated according to the status of the inverter output poles has significantly varying waveforms for the failure modes that the present invention is able to detect.

The most valuable information is the periodic rate of the signal, which is a multiple of the base frequency of the system. Common power distribution networks are based on frequencies of either 50 Hz, or 60 Hz. The HIMFD system of the present invention disregards variations in the base frequency that are within the tolerance limits of the source frequency.

Since source voltages can vary considerably, fault detection based on signal level sensing is not as effective or simple, as signal frequency based detection, which is used in the embodiment described herein for the this invention. However, the present invention can also use other techniques such as reading the signal content. "message" from the signal waveform, by analyzing and comparing a profile to known signatures in the sensing of status of the inverter output.

The techniques of how to read and process the signal of the captured status of the inverter output may vary from fixed limit justification to intelligent processing, which allows not only adaptation to different acceptable conditions without false activation, but more accurate justification and identification for correct operation.

Examples of the abnormal status that the HIMFD system of the present invention detects are:

a) One or more output phase(s) grounded as a result of a failure in insulation (cables, motor) Wiring error can also be a cause for the grounded output phase.

b) A wiring error to cause the inverter to be energized from a backward path (via free wheeling diodes in the inverter bridge) when the input leads are wired to the output terminals.

The present invention keeps the power circuit, that is the inverter, in the high impedance mode until after it has been determined that neither of the described abnormal statuses exist. This allows one or both of the abnormal statuses to be detected without the existence of high current in any part in the circuit.

The term high impedance mode has in this invention two meanings as follows:

1) No output devices, that is the inverter switches, are controlled to the ON state where they are in the conducting (low impedance) mode such that current is passed through the devices.

2) Limited current in the case of the abnormal status where the wiring error of input leads to output is present. Configuration of the pre-charging circuit and its control scheme must be such that the capacitor bank stays isolated from the main circuit until it is determined that no abnormal status exists. In this case, the isolation is through high impedance between the intermediate link and the DC bus whose value is determined by design to limit current in the circuit to a safe level.

Figure 1:
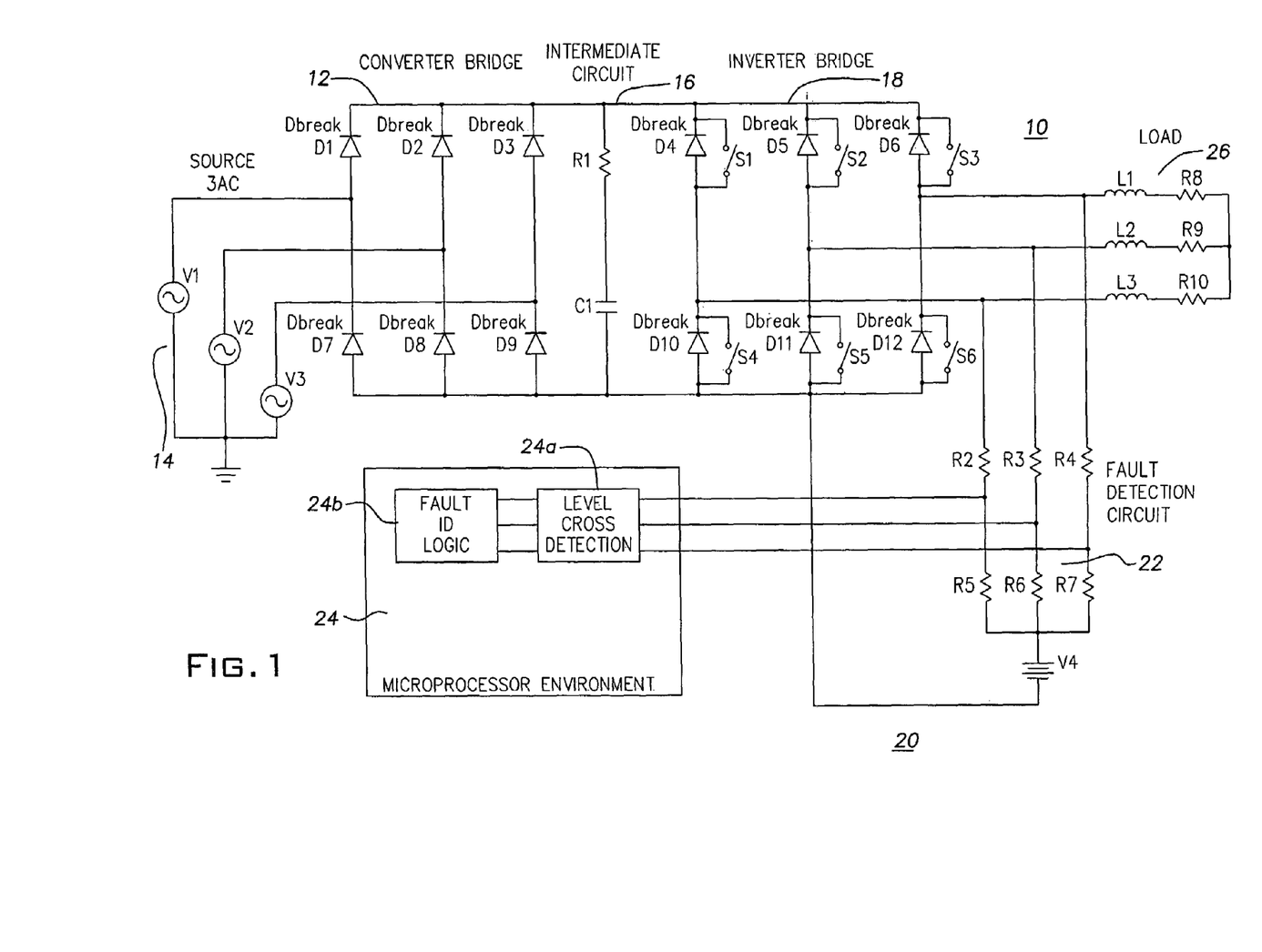
FIG. 1 shows a three phase ac to ac converter that includes the high impedance fault mode detection (HIFMD) system of the present invention.

FIG. 1 shows a three-phase ac to ac converter 10 that includes the HIMFD system of the invention. As is shown in FIG. 1, the converter 10 has a converter bridge 12 connected to a source 14 of three phase AC voltage. Converter 10 also includes intermediate circuit 16 connected to the output of converter bridge 12 and inverter bridge 18 connected to the output of intermediate circuit 16 and to load 26. The output inverter 18 is presented in simplified configuration with the controlled switches S1 to S6, each associated with a respective one of diodes D4 to D6 and D01 to 012, shown in FIG. 1 in symbolic form and open since the inverter bridge 18 is in the high impedance mode.

Converter 10 further includes the high impedance mode fault detector 20 of the present invention which is connected to the inverter bridge 18. As is shown in FIG. 1, the fault detector 20 in this embodiment has a resistor network 22 comprising resistors R2 to R7 and microprocessor environment 24 comprising level cross detection circuit 24a and fault ID logic 24b. The output of the resistor network 22 is fed to level cross detection circuit 24a, which may be embodied by comparators, to determine the timing of the signal crossing the trigger level. Each output phase of converter 10 is monitored individually and each signal represents the known phase. This makes it possible to determine which of the output phases are under a fault condition.

The transitions of the digital output of the level cross detection circuit 24a are counted by the fault ID logic 24b which is embodied in software in a microprocessor (not shown) for a fixed period of time. If the number of transitions occur at a rate equal to approximately six times the base frequency then the microprocessor can determine that a grounded output exists.

If the number of transitions occur at a rate equal to approximately two times the base frequency then the microprocessor can determine that an output wiring fault exists.

Figure 2:
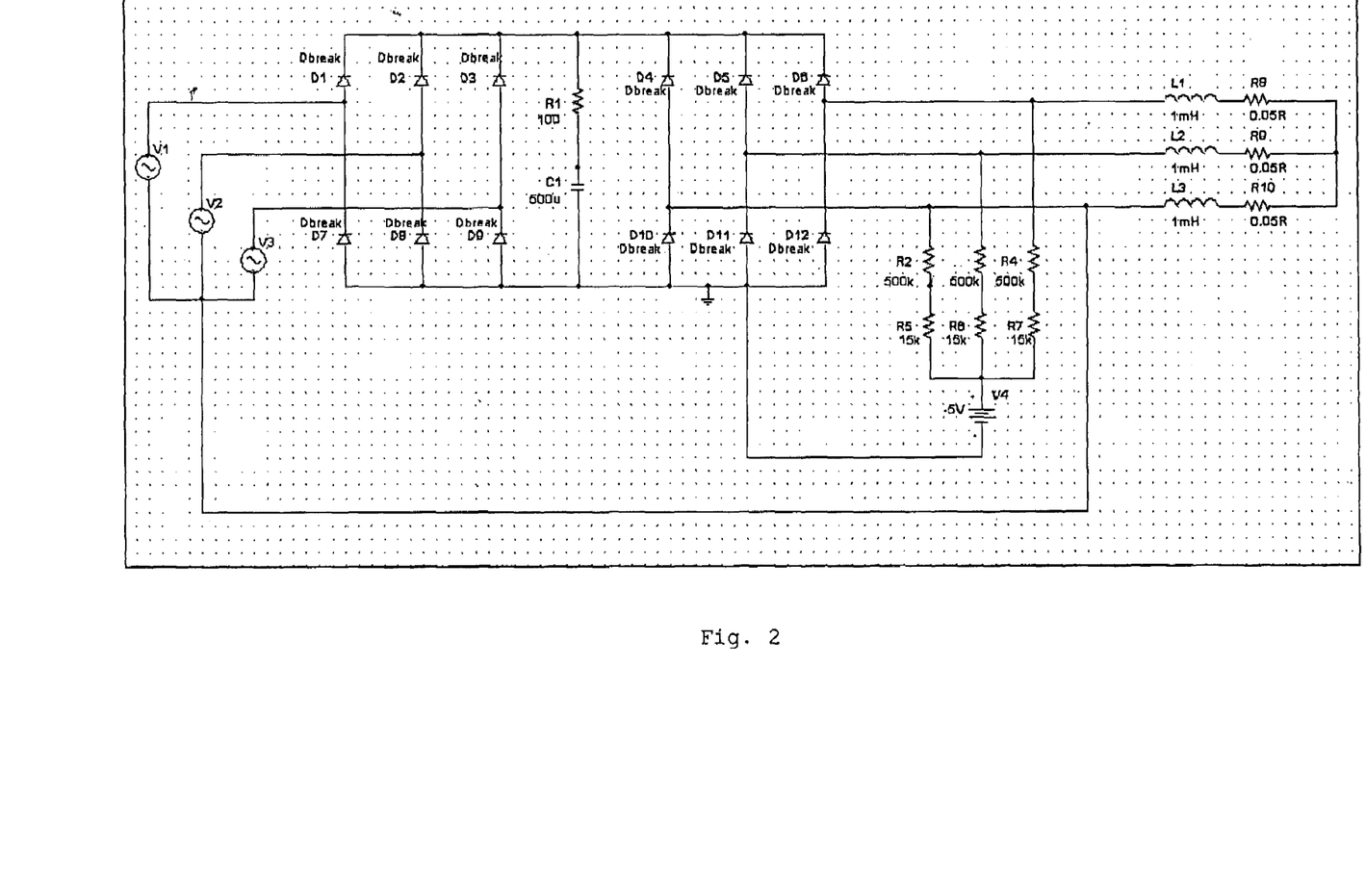
FIG. 2 shows how the HIMFD system is coupled to the power source when one of the converter output phases has a ground fault.

FIG. 2 shows how the HIMFD system is coupled to the source in a grounded power distribution system in the case where one of the converter output phases is under a failure mode, such as a ground fault. The switches S1–S6 are not shown in this figure as they are identical to the switches S1–S6 shown in FIG. 1. The microprocessor environment 24 is not shown in this figure solely for ease of illustration.

Figure 3:
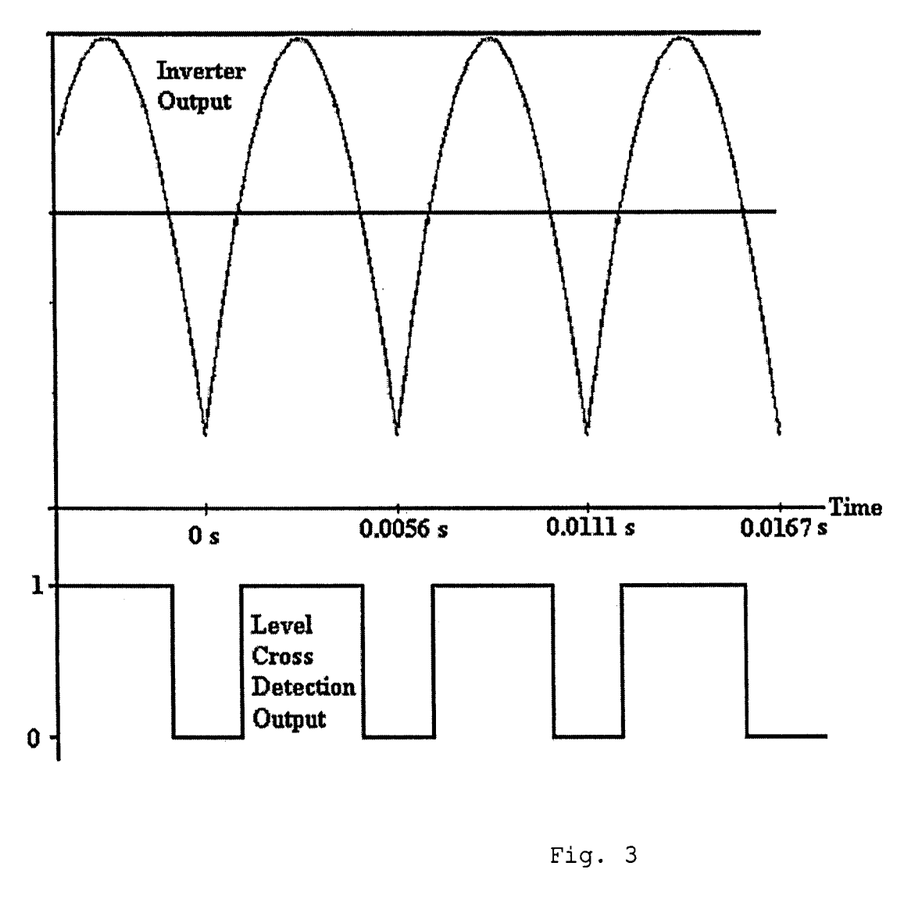
FIG. 3 shows the signal waveform from the HIMFD system in the case of the fault of FIG. 2.

FIG. 3 shows the signal waveform from the HIMFD system in the case of a grounded output phase. In this example, the system is supplied from a three phase, 480Vac, 60Hz voltage source. As can be seen in FIG. 3, the number of transitions of the digital output of level cross detection circuit 24a occur at a rate equal to about six times the base frequency of 60Hz since as is well known the time for one cycle of a 60Hz waveform is 16.666 milliseconds.

Figure 4:
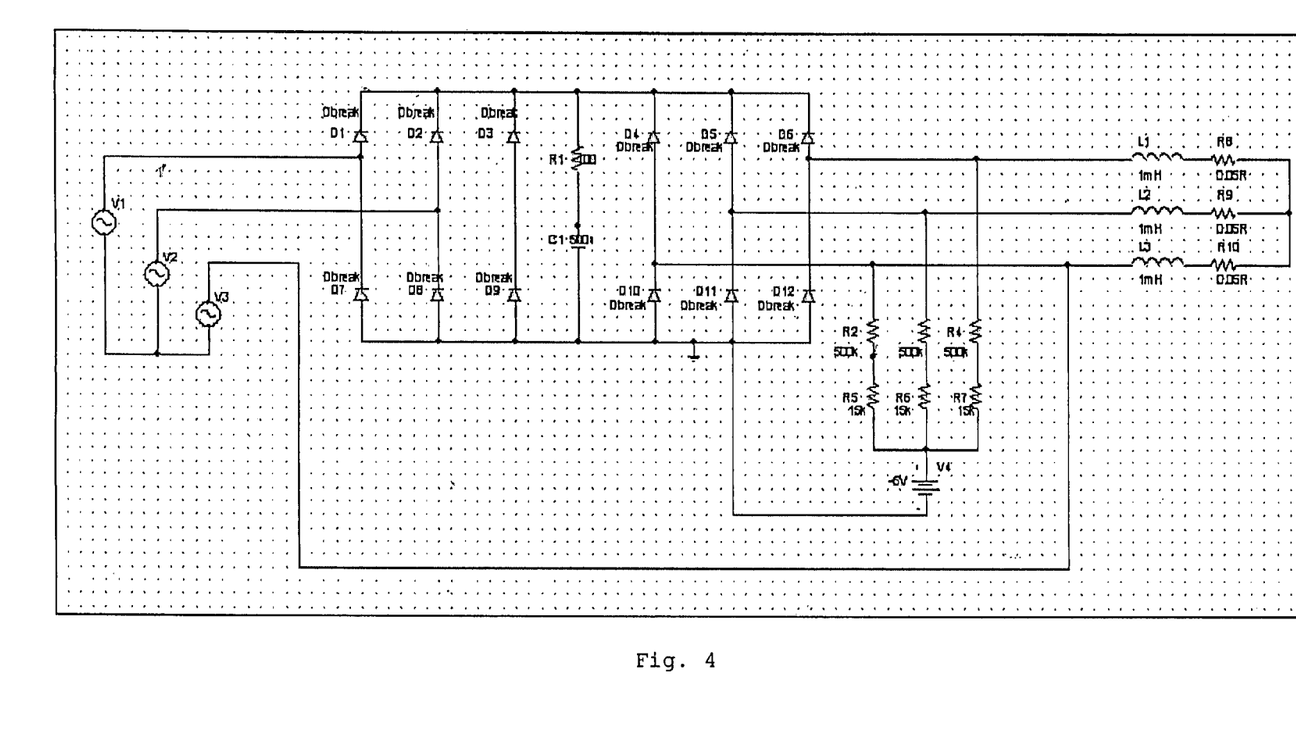
FIG. 4 shows the coupling of the HIMFD system in the case of a mis-wired input/output.

FIG. 4 shows the HIMFD system coupling in the case of a mis-wired input/output, where one feeding phase is connected to the output of the inverter. The switches S1–S6 are not shown in this figure as they are identical to the switches S1–S6 shown in FIG. 1. The microprocessor environment 24 is not shown in this figure solely for ease of illustration. This condition corresponds to the case, where all phases of the source are connected to the output and the signal represents feedback from one phase.

Figure 5:
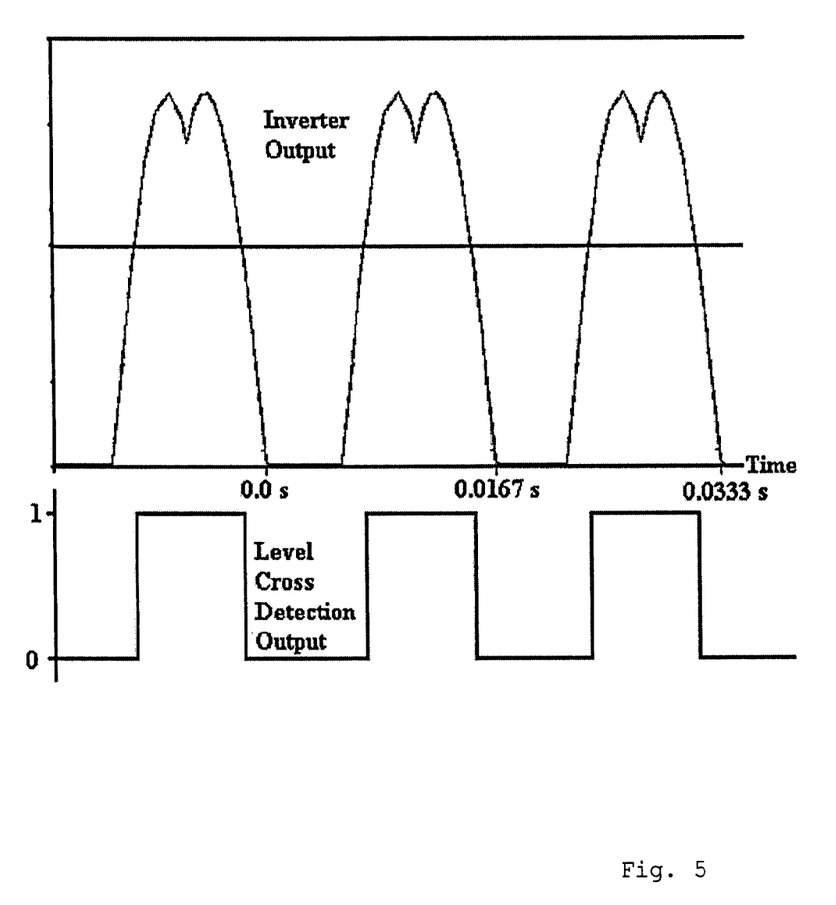
FIG. 5 shows the signal waveform from the HIMFD system in the case of the fault of FIG. 4.

FIG. 5 shows the waveform from the HIMFD system in the case of an input wiring error. In this example, the system is supplied from a three phase, 480Vac, 60 Hz voltage source. As can be seen in FIG. 5, the number of transitions of the digital output of level cross detection circuit 24a occur at a rate equal to about two times the base frequency of 60 Hz.

Figure 6:
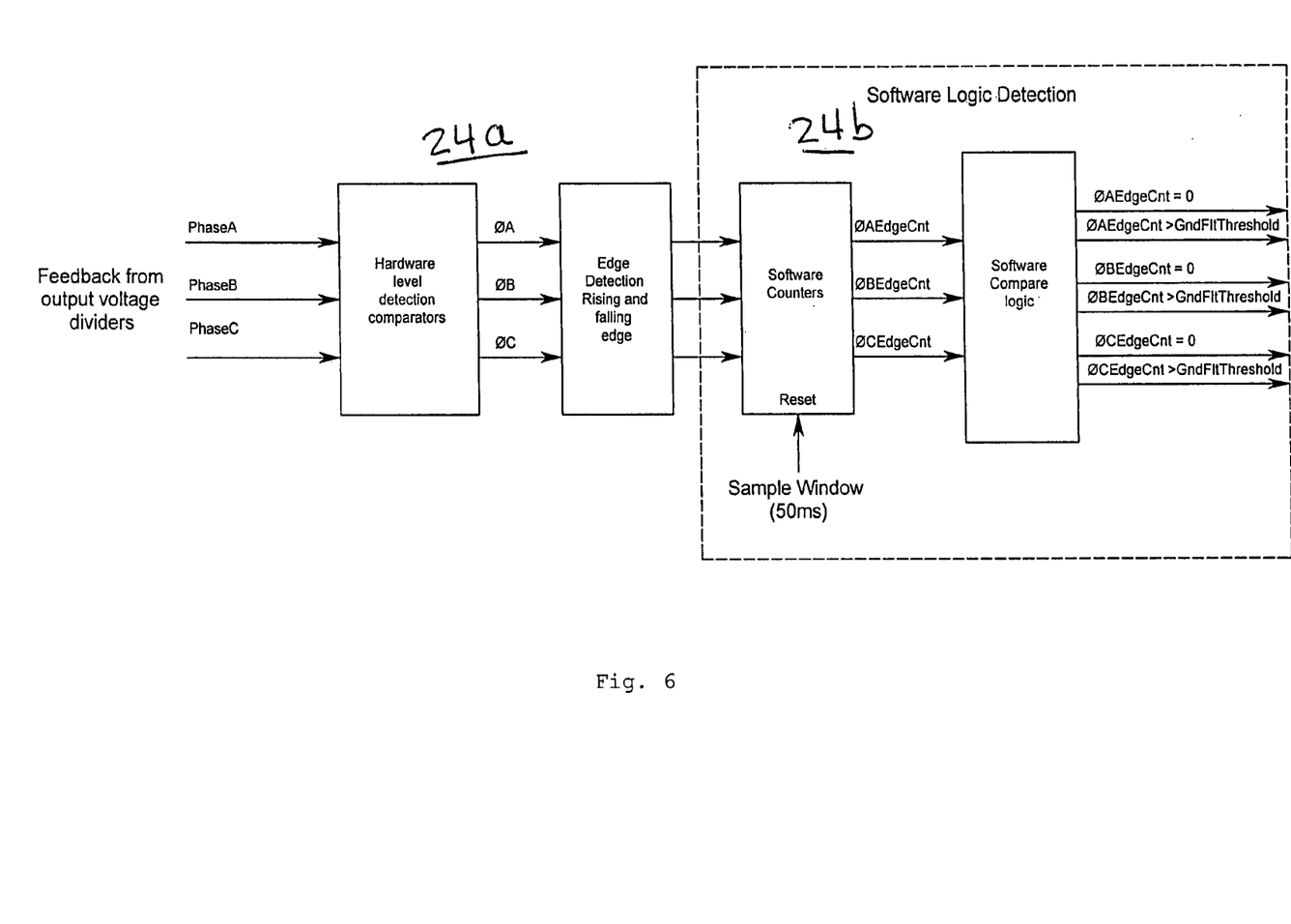
FIG. 6 shows a more detailed block diagram for the HIMFD system.

FIG. 6 shows the block diagram for the software detection performed in the HIMFD system. The "Hardware Level detection comparators" and "Edge detection rising and falling edge" blocks in FIG. 6 are the same as the. "Level Cross Detection" circuit 24a in FIG. 1 and are collectively given that reference numeral in FIG. 6. The "Software Counters" and "Software compare logic" blocks in FIG. 6 are the same as the fault ID logic 24b in FIG. 1 and are collectively given that reference numeral in FIG. 6. The voltage feedback edges are counted over a 50 ms sample period.

Upon power-up, the status of the output circuit, that is the inverter, is determined as follows:

1. If there are no edges detected the output circuit is in a normal safe condition.

2. If the accumulated edges are greater than the ground fault threshold value the output circuit has a ground fault.

3. If there are edges detected but the number is below the ground fault threshold the output wiring is reversed.

The ground fault threshold is set based on the supply line frequency and the sampling window used. Based on the waveform of FIG. 3, if a ground fault exists there will be six (6) edges per fundamental input line period as opposed to the two (2) edges per period shown in FIG. 5 if there is an output wiring fault.

After the power up-test for ground fault and reverse wiring are completed, the status of the detection logic is tested whenever the inverter switches are disabled. Under this condition only the output ground fault detection needs to be tested because the unit would have to be powered down to reverse the wiring. It should be noted that under normal operating conditions there should never be any edges detected when the inverter switches are in the high impedance state.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. In an inverter having one or more controlled switches and an output, a method comprising:
   determining the time of occurrence when a voltage of a signal at said inverter output crosses a predetermined amplitude;
   analyzing the time voltage crossing occurrences of said signal at said inverter output with said inverter operating in a mode with all of said one or more controlled switches in said inverter not energized to determine the occurrence of one or more of a predetermined number of conditions associated with said inverter output; and
   determining the occurrence of a fault in said inverter operating in said mode wherein all of said one or more controlled switches in said inverter are not energized when said analysis determines that one of said predetermined number of conditions associated with said inverter output exceeds an associated predetermined criteria.

2. The method of claim 1 wherein said fault is a ground fault in said inverter.

3. The method of claim 1 wherein said fault is a mis-wired input/output in said inverter.

4. The method of claim 1 wherein said inverter is a three phase inverter.

5. A combination comprising:
   an inverter having one or more controlled switches and an output for connection to a load; and
   means connected to said inverter output for analyzing a signal at said inverter output with said inverter operating in a mode with all of said one or more controlled switches in said inverter not energized and detecting a fault in said inverter operating in said mode wherein all of said one or more controlled switches in said inverter are not energized when said analysis of said inverter output exceeds a predetermined criteria;
   wherein said inverter has an input for connection to an AC source having a base frequency and said analyzing and detecting means comprises:
      a level crossing detector for determining the time of occurrence when voltage at said inverter output crosses a predetermined amplitude: and
      means for counting the number of said time voltage crossing occurrences occurring within a predetermined period of time and declaring the occurrence of a fault condition in said inverter operating in said mode in which all of said one or more controlled switches in said inverter are not energized when said number is a predetermined multiplier related to said base frequency.

6. The combination of claim 5 further comprising an AC source having said base frequency connected to said inverter input.

7. The combination of claim 6 further comprising a converter having an input connected to said AC source and an output and an intermediate circuit connected between said converter output and said inverter input.

8. A circuit for detecting the occurrence of a fault in an inverter having an output comprising:

means connected to said inverter output for analyzing a signal at said inverter output with said inverter operating in a mode with all of said one or more controlled switches in said inverter not energized to determine the occurrence of one or more of a predetermined number of conditions associated with said inverter output, and detecting a fault in said inverter operating in said mode wherein all of said one or more controlled switches in said inverter are not energized when said analysis of said inverter output determines that one of said predetermined number of conditions exceeds an associated predetermined criteria;

wherein said inverter has an input for connection to an AC source having a base frequency and said inverter output analyzing and detecting means connected to said inverter output comprises:

a level crossing detector for determining the time of occurrence when a voltage at said inverter output crosses a predetermined amplitude; and means for counting the number of said time voltage crossing occurrences occurring within a predetermined period of time and declining the occurrence of a fault condition in said inverter operating in said mode in which all of said one or more controlled switches in said inverter are not energized when said number is a predetermined multiplier related to said base frequency.

* * * * *